United States Patent Office 2,753,692
Patented July 10, 1956

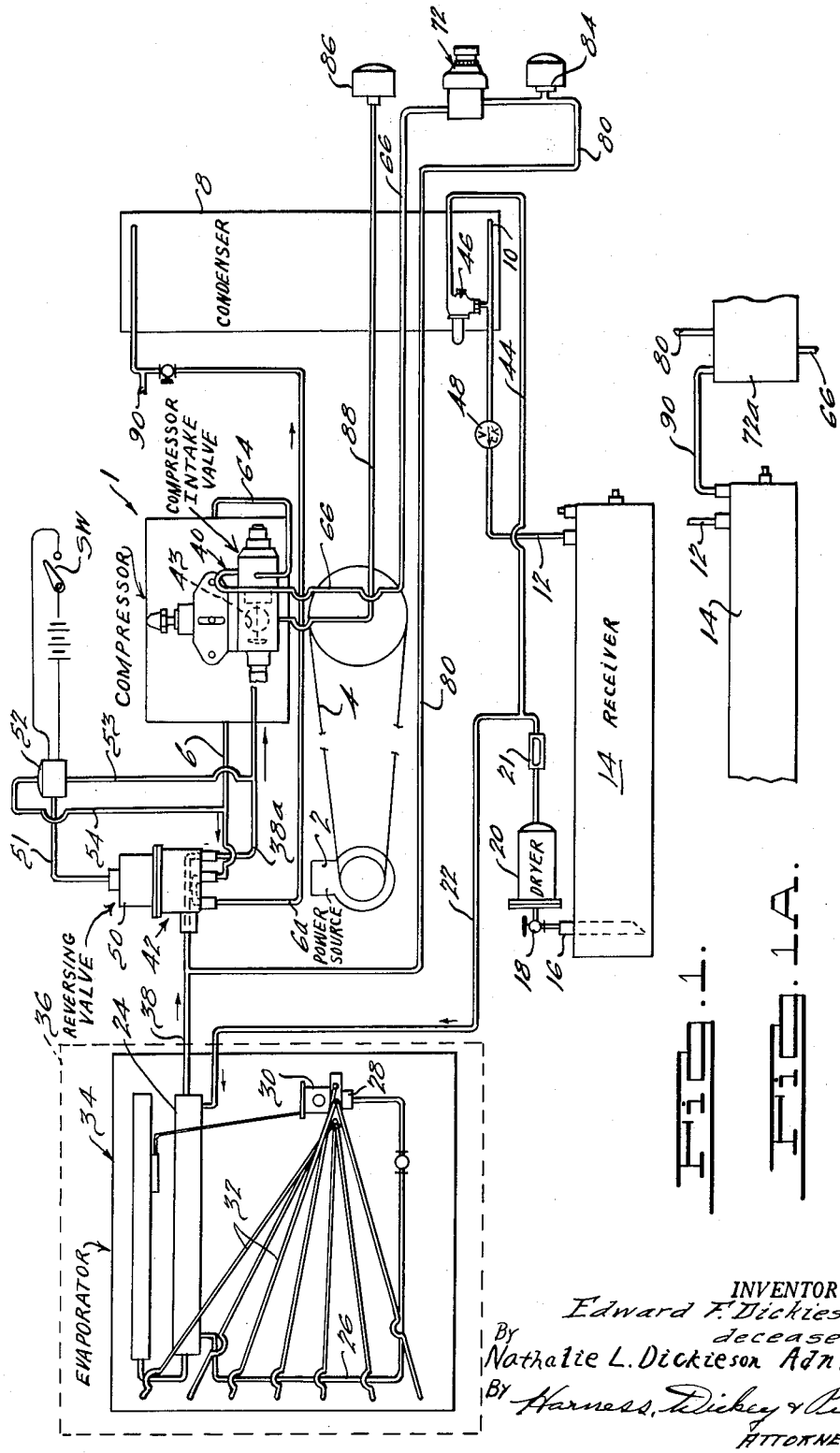

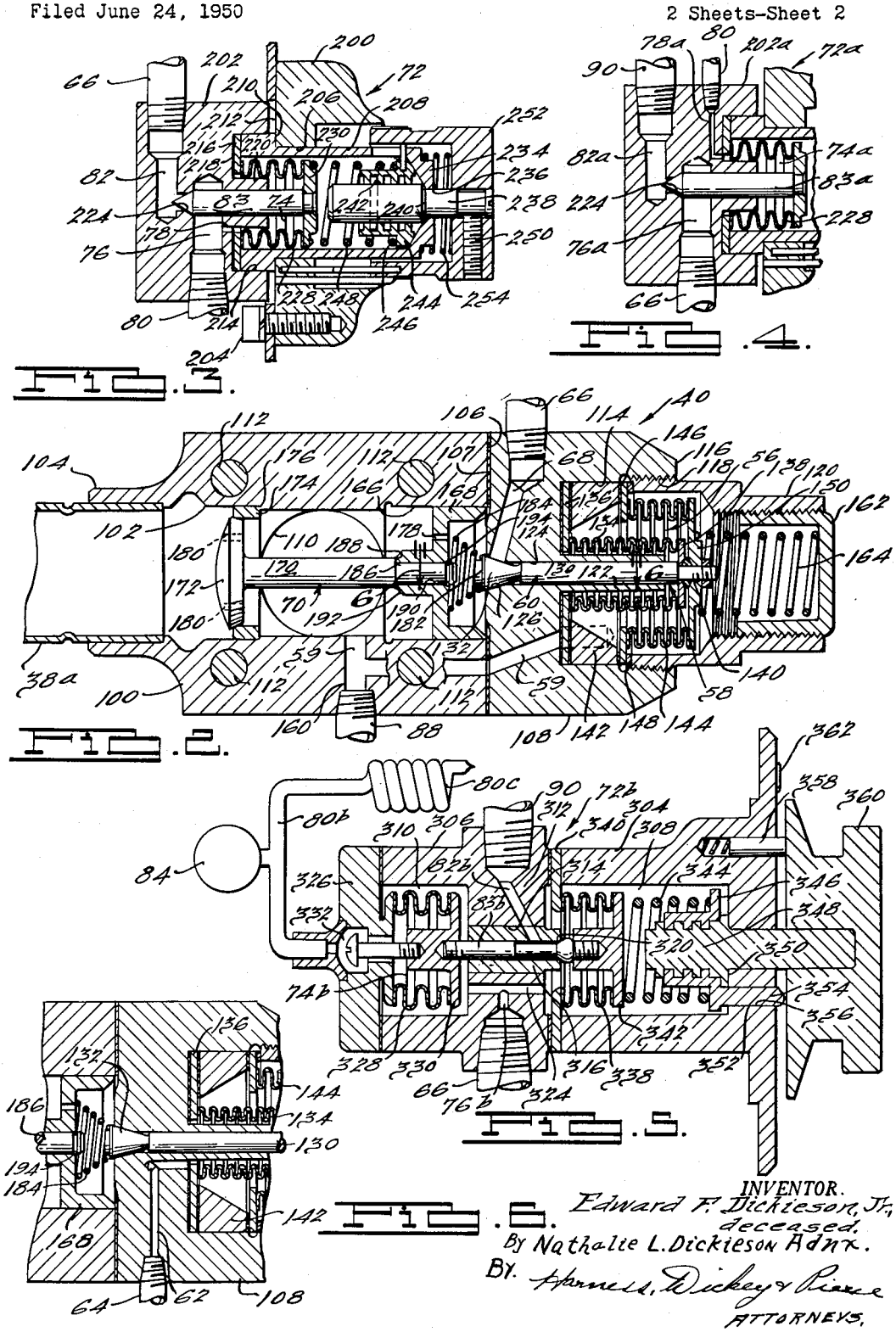

2,753,692
CONTROL APPARATUS FOR REFRIGERATION SYSTEM

Edward F. Dickieson, Jr., deceased, late of Detroit, Mich., by Nathalie L. Dickieson, administratrix, Detroit, Mich., assignor to Nathalie L. Dickieson, Detroit, Mich.

Application June 24, 1950, Serial No. 170,068

6 Claims. (Cl. 62—3)

This invention relates generally to methods of and apparatus for refrigeration and is particularly adapted among other uses in connection with the cooling of vehicle bodies.

This application is an improvement on and a carrying forth of the inventions shown and described in my copending applications, Serial Nos. 750,947, now Patent No. 2,626,506; 74,585; and 74,586, now Patent No. 2,626,507, filed respectively May 28, 1947; February 4, 1949 and February 4, 1949 and contains claims covering valve structures shown in application Serial No. 74,585.

An object of this invention is to provide an improved method of and apparatus for controlling the operation of refrigerating systems.

Another object is to provide such an apparatus which may be powered by a constant speed continually operating source of prime power.

Another object of this invention is to provide such an apparatus which is prevented from being overloaded and which will maintain substantially constant temperatures in the space being cooled.

Another object of this invention is to provide a new and improved controlling means for controlling the flow of refrigerant from the evaporator to the compressor.

Another object is to provide such a controlling means which may readily be adjusted to maintain the cooled space at any desired temperature.

Another object of this invention is to provide means for quickly reducing the load on the compressor at desired times such as, for example, in starting the prime mover.

Another object is to provide such a mechanism in combination with the normal temperature controlling mechanism and which may be operated for reducing the load at desired intervals without changing the normal seating at which the device normally controls the space temperature.

Other objects will be apparent from the specification, the appended claims and the drawings in which drawings:

Figure 1 is a diagrammatic view of a refrigerating system embodying the invention;

Fig. 1A is a partial diagrammatic view of a portion of the system of Fig. 1 showing a modified form of control;

Fig. 2 is a view in central vertical section through the suction line controlling valve embodying the invention;

Fig. 3 is a view in vertical section through the temperture controlling valve for controlling the action of the suction line valve of Fig. 2;

Fig. 4 is a view in partial central vertical section showing a modified form of the valve of Fig. 3 for use with the modified system partially shown in Fig. 1A;

Fig. 5 is a view in central vertical section of a modified form of temperature responsive valve for controlling the operation of the suction line valve shown in Fig. 2; and Fig. 6 is a partial sectional view of the valve of Fig. 2 but taken in a different plane.

The invention is shown as applied to a refrigerating system comprising a compressor 1 which is continuously driven from a suitable driving mechanism such as a gasoline engine 2 connected thereto through a belt 4. The compressor 1 is of the conventional type and has a discharge port (not shown) connected by means of conduits 6 and 6a to discharge compressed refrigerant into a conventional condenser 8. The condenser 8 may be of the air cooled type and provided with the usual fan (not shown) for blowing cooling air thereover to remove heat from the condenser to cause the refrigerant to condense to liquid form. The liquid refrigerant then flows from the condenser outlet 10 through conduit 12 to the liquid receiver 14. Liquid refrigerant flows from the outlet 16 of the receiver through a shut-off valve 18 and dryer unit 20 into conduit 22 which leads to the liquid input connection of a heat exchanger 24. The liquid outlet of the exchanger 24 is connected by conduit 26 to the inlet 28 of a thermostatic expansion valve 30. The valve 30 is herein shown as being of the multi outlet type and is conventionally connected by distributor connection 32 to an evaporator 34 located in the space 36 to be cooled or otherwise tempered. The outlet of the evaporator 34 is connected through the exchanger 24 to conduits 38 and 38a and valve 40 to the intake port of the compressor 1.

In order that the system may be operated under reversed cycle conditions a reversing valve 42 of a type readily obtainable on the market is inserted in the conduits 6, 6a, 38 and 38a. This valve 42 in one position acts to interconnect conduits 6 and 6a and conduits 38 and 38a for normal cooling operation of the system. In a second position valve 42 acts to connect conduit 6 with conduit 38 and conduit 38a with conduit 6a whereby the condenser 8 will act as an evaporator and evaporator 34 will act as a condenser. In order to provide for such reverse flow of refrigerant the conduit 22 is provided with a branch conduit 44 which feeds liquid refrigerant from the conduit 22 through an expansion valve 46 to the condenser 8. The vaporized refrigerant then flows through conduit 6a, valve 42, conduit 38a, valve 40, and suction port 43 to the compressor 1. The compressor 1 discharges into the evaporator 34 through conduits 6 and 38 and valve 42. To prevent flow of gaseous refrigerant from the receiver directly to the condenser 8, the conduit 12 is provided with a check valve 48 which permits flow of fluid solely in the direction from the condenser to the receiver.

The valve 42 is provided with a pressure responsive control element 50 which is connected by conduit 51 to a solenoid operated control valve 52. The valve 52 in its de-energized position connects the conduit 51 with a branch conduit 53 of the suction conduit 38a whereby suction pressure is maintained in the element 50 to cause the valve 42 to remain in its shown position in which conduits 6 and 6a and 38 and 38a are connected together. Energization of the valve 52 connects conduit 51 with a branch conduit 54 of the conduit 6 leading to the high pressure side of the refrigeration system which may be to the discharge outlet (not shown) of the compressor 1. Valve 52 is shown as being under control of a manually operated switch SW, which may be closed to provide reverse cycle operation for heating of the space 36 or defrosting of the evaporator 34.

The compressor 1 is continually driven and the valve 40 acts on the one hand to throttle the flow of suction gas to prevent overloading of the compressor 1 and on the other hand to prevent the compressor 1 from maintaining too low a pressure in the evaporator 34 and consequently too low a temperature in the space 36. Control of the valve 40 to prevent overloading by the combined pressures of the vapor or gas being admitted to the compressor 1 through its intake 43 and the pressure of the gas being discharged from the compressor through the conduit 6 is accomplished by admitting pressure to a pair of pressure chambers 56 and 58 shown in Fig. 2 and to be described more in detail hereinafter. The chamber 56 is connected through an internal passageway 59 of the body or casing of the valve 40 to render the load limiting pilot valve element 60 responsive to the inlet pressure of the compressor 1. The chamber 58 is connected through passageway 62 and conduit 64 (see Figs. 1 and 6) to the discharge outlet of the compressor 1 to render pilot valve element 60 responsive to the outlet or discharge pressure. The pilot valve element 60 controls the flow of a control gas supplied through conduit 66 and passageway 68 to control the positioning of the main control valve element 70 in response to the combined pressures within the chambers 56 and 58 to prevent overloading of the engine 2.

In order to prevent too low a pressure and temperature in the evaporator 34, an evaporator pressure pilot valve 72 (shown in detail in Fig. 3) is provided which has a pressure sensitive chamber 74 open through passageway 76, bore 78, conduit 80 and the suction conduit 38 to the evaporator 34 whereby the pilot element 83 is positioned to admit fluid flow from conduit 80 to passageway 82 and conduit 66 to position the valve element 70. It will be appreciated that the valve element 83 will be open for all evaporator pressures and temperatures above the desired temperature to permit the valve element 70 to be responsive to the pilot valve element 60 and at desired evaporator pressures and temperatures the element 70 will be responsive to the element 83. In this form the pressure differential for actuating the element 70 is derived from the pressure differential between that in the conduit 38 at the connection with the conduit 80 and that at the inlet 43.

If desired a pressure gauge 84 (Fig. 1) calibrated to indicate evaporator temperature may be placed in the conduit 80. A second pressure gauge 86 (Fig. 1) may be connected by a conduit 88 to the passageway 59 to indicate the inlet pressure to the compressor 1.

When the valve 72a is used (see Figs. 1A and 4), the conduit 80 is connected to the passageway or bore 78a to provide for evaporator pressure within the chamber 74a to control the element 83a. The passageway 82a is connected by a conduit 90 to the receiver chamber 14 or to the outlet of the compressor 1 or to some other source of gas on the high pressure side of the system. The passageway 76a is connected as in Fig. 1 by conduit 66 to the passageway 68. In this form the operating pressure for the valve element 70 is derived from the difference in pressure across the compressor 1.

When the control 72b of Fig. 5 is used the passageways 82b and 72b are connected as in Fig. 1A. The conduit 80 connected to the evaporator 34 is omitted and a sealed flexible conduit 80b having a temperature sensitive portion 80c containing a charge of a temperature responsive fluid is connected to the chamber 74b. The portion 80c may be placed either against the evaporator or at other locations within the space 36 and will act to control element 70 to maintain that point at constant temperature.

The valve 40 more completely shown in Figs. 2 and 6 comprises a casing 100 having an internal passageway 102 opening outwardly through a boss 104 in one end wall of the casing 100. The passageway 102 also opens outwardly through the opposite end wall 106 of the casing 100 which opening is closed by means of a second casing 108. The second casing 108 may be secured to the casing 100 with its end wall 107 in fluid tight relation to the end wall 106 by any suitable means such as bolts not shown. Substantially midway of the passageway 102, the casing 100 is provided with a laterally opening port 110 which registers with the inlet port 43 of the compressor 1. Bolts 112 may be used to secure the casing 100 to the inlet of the compressor 1 in a fluid tight manner.

The casing 108 has an aperture 114 opening outwardly through its end wall 116 opposite to the casing 100. This aperture is internally threaded as at 118 for threaded reception of a tubular member 120. A boss 122 extends outwardly into the aperture 114 from the bottom wall thereof and is provided with a central aperture 124 which opens into the aperture or recess 114 and opens outwardly through the end wall 107 into the passageway 102. The opening of the aperture 124 through the end wall 107 is shaped to provide a valve seat 126. The pilot valve element 60 has a stem portion 130 slidable within the aperture 124 and extending outwardly through the end wall of the boss 122. The other end of the valve element 60 is provided with a port controlling element 132 which cooperates with the valve seat 126 to control flow of fluid from the passageway 68 to the end of the passageway 102 adjacent the wall 106.

A bellows member 134 is positioned concentrically with the boss 122 and is sealed to the internal periphery of an annular ring 136. The opposite end of the bellows 134 is sealed to an end plate 138 which is centrally apertured to receive a reduced diameter end portion 140 of the valve stem 130. The plate 138 and stem 130 are suitably sealed together in fluid tight nonmovable relation. A suitable annular sleeve 142 seats against the outer surface of the annular ring 136 and fits within the recess 114 to hold the plate 138 tightly in fluid tight relation with the bottom wall of the recess 114 thereby defining the fluid tight chamber 58.

A second bellows 144 is arranged concentrically with the bellows 134 and has one end thereof sealed in fluid tight relation to an annular ring 146 which seats against the outer face of the annular sleeve 142 and is held tightly thereagainst by means of the tubular member 120. If desired, a gasket 148 may be provided. The opposite end of the bellows 144 is sealed in fluid tight relation to an end plate 150 which is centrally apertured to receive the reduced valve stem portion 140 which is suitably sealed to the plate 150 in a fluid tight manner to form the fluid tight chamber 56.

The outwardly extending end of the tubular member 120 is interiorly threaded for receiving the external threads of a cap member 162. A helical coil spring 164 is arranged within the cap member 162 and has one end portion in engagement therewith and its other end portion abutting against the adjacent plate 150. The force exerted by the spring 164 may be controlled by the position of the cap member 162 to determine the maximum compressor loading.

The end of the passageway 102 adjacent the wall 106 provides a cylinder portion 166 in which is received a piston portion 168 of the valve element 70. The element 70 has a piston rod 170 extending through the passageway 102 toward the boss 104 which carries at its outwardly extending end a valve port controlling member 172 which is cooperable with a port member 174 suitably positioned within the passageway 102 as against the shoulder 176. The piston 168 is provided with a metering flow port 178 and the member 172 is provided with one or more through passageways 180. If desired the valve element 60 may be provided with a shoulder 182 which receives one end of a helical coil spring 184, the other end of which abuts the adjacent side of the piston 168. The piston rod 170 preferably has a reduced diameter end portion 186 which extends through a central passageway 190 of an outwardly extending boss 192 of the piston 168. A shoulder 188 of the rod 170 seats against the boss 192 with the reduced diameter portion 186 extending clear through the piston 168. A snap ring 194 holds the rod 170 and piston 168 in assembled relation.

Referring now to Fig. 3, the control valve 72 comprises a pair of interfitting casings 200, 202 suitably secured together as by means of screws 204, one only of which is shown. The casing 200 is provided with a central aperture 206 extending completely therethrough and in which is positioned a cup-shaped member 208 having at its lip a shoulder 210 which seats against the one end wall 212 of the casing 200. The casing 202 has a central aperture 214 which registers with the aperture 206 and in which is located the enlarged diameter lip portion of the cup-shaped member 208. An annular member 216 seats against the lower end wall of the aperture 214. The length of the enlarged diameter portion of the member 208 which extends outwardly of the shoulder 210 is so related to the depth of the aperture 214 and the thickness of the annular member 216 that upon tightening of the screws 204 a fluid tight seal is provided between the bottom of the aperture 214 and the annular member 216. If desired a gasket 218 may be inserted between the annular member 216 and the casing 202.

The casing 202 is provided with a hollow boss 220 which extends toward the casing portion 200 and in which is positioned the valve element 83. The element 83 cooperates with a valve port 224 formed at the intersection of passageways 76 and 82. A bellows member 228 positioned concentrically of the element 83 has one end portion secured to the annular member 218 in fluid tight relation and has its other end secured in fluid tight relation to a platelike member 230 to which also is secured one end of the element 83. The chamber 74 formed by the bellows 228 is connected by means of passageway 78 to the passageway 76 whereby the evaporator pressure appearing in the conduit 80 will prevail within the chamber 74.

The end wall 234 of the cup-shaped member 208 is centrally apertured as at 236 to receive a rotatable stud 238. The stud 238 is provided with a shoulder 240 which seats against the inner surface of the end wall 234 and is also provided with a diametrically extending pin 242 which seats at its oppositely extending end portions within the internal square threads of a sleeve 244 provided with a shoulder 246 for supporting one end of a helical coil spring 248. The other end of the spring 248 abuts the plate member 230 whereby the spring controls the pressures within the chamber 74 for operating the valve element 83. The portion of the stud 238 outwardly of the cup-shaped member 208 is suitably secured as by means of a set screw 250 to an adjusting knob 252. A helical coil spring 254 positioned under compression between the cup-shaped member 208 and the knob 252 continually urges the shoulder 240 into engagement with the end wall 234. Rotation of the knob 252 rotates the stud 238 and its diametrically extending rod 242 whereby the rod 242 moves the sleeve longitudinally of the stud 238 for adjusting the force exerted by the spring 248 against the platelike member 230.

In Fig. 4 a slightly modified form of valve body 202a is illustrated. The construction of the valve body 202a differs from the construction of the body 202 by providing a passageway 78a separate from passageway 76a to communicatively connect chamber 74a with the conduit 80. This separation of the passageways permits evaporator pressure to be transmitted to the chamber 74a and a different pressure to be supplied by conduit 90 for actuation of the valve 40. When this type of construction is used the conduit 90 is connected to the high pressure side of the system to provide for a greater pressure difference to be supplied to the piston member 168 of the valve 40.

Fig. 5 illustrates another modified form of the controlling valve of Fig. 3 and which operates to control the system in accordance with temperature surrounding the sensitive portion 80c rather than in accordance with evaporator pressure as do the valves 72 and 72a. The control 72b comprises a pair of casing sections 304 and 306 suitably connected together. Sections 304 and 306 are provided respectively with interior chambers 308 and 310. The casing setcion 306 is provided with an internal wall structure 312 which separates the chambers 308 and 310. The wall 312 is provided with an aperture 314 extending therethrough and in which is positioned a hollow valve sleeve 316. The valve element 83b is slidable within the hollow interior of the sleeve 316 and is provided with a seat engaging surface 320 which is cooperable with the opening of the hollow interior of the member 316 into the chamber 308. The casing section 306 is provided with the inlet passageway 82b which may be connected similarly to the valves 72 or 72a either to the conduit 80 or to the conduit 90. The chambers 308 and 310 are communicatively connected together by means of fluid flow passageway 324 having the passageway 76b which is connected by means of the conduit 66 to the valve 40.

The casing section 306 is provided with an end wall 326 which carries in a fluid tight manner one end of a bellows member 328 defining the chamber 74b. The other end of the member 328 is secured in fluid tight relation to a pressure responsive movable wall 330 which is secured to the valve element 83b. The wall 326 is apertured as at 332 to communicatively connect the chamber 74b to the conduit 80b which is coiled at its opposite end to provide the portion 80c. If desired, the temperature calibrated pressure gauge 84 may be connected to the conduit 80b to indicate the temperature at the portion 80c.

A bellows 338 is located within the chamber 308 and has one end portion thereof secured in fluid tight relation to an annular member 340 which is clamped between the casing sections 304 and 306. The other end of the bellows 338 is secured in fluid tight relation to a pressure responsive movable wall 342. The valve element 83b extends within the bellows 338 and is suitably secured to this wall 342. The bellows 328 and 338 are of the same effective diameter and the passageway 324 opens into the chamber 310 exteriorly of the bellows 328 and into the chamber 308 interiorly of the bellows 338 whereby the bellows act to compensate each other for the pressure existing within the passageway 76b so that the position of the element 83b is controlled entirely by the pressure within the chamber 74b which in turn is controlled by the temperature surrounding the element 80c.

A spring 344 is provided to adjust the temperature at which the element 83b is controlled to permit passage of fluid through the passageways 82b and 76b. The spring 344 is held under compression between the wall 342 and an internally threaded sleeve 346 threadedly secured to an adjusting shaft 348 having a shoulder 350 which engages the inner surface of end wall 352 of the casing section 304. The sleeve 346 is provided with a pin 354 which is received within an aperture 356 in the wall 352 and acts to prevent rotation of the sleeve 346 upon rotation of the shaft 348. A suitable detent mechanism 358 cooperates with a knob 360 secured to the shaft 348 so that the shaft 348 may be held in adjusted rotative position whereby the force exerted by the spring 344 may be adjustably controlled. The knob 360 may be provided with suitable calibrating indicia cooperating with an embossed indicating pointer or finger 362.

The operation of the system is as follows:

The engine 2 is continually operated to drive the compressor 1 by means of the belt 4 whereby the refrigerant admitted to the compressor through the inlet 43 is compressed and discharged at a higher pressure through the discharge conduit 6, the reversing valve 42, conduit 6a into the condenser 8. Heat is removed from the refrigerant in the condenser 8 and the refrigerant condenses into a liquid which flows through the outlet conduit 12 into the receiver 14. Liquid from the receiver 14 flows through the liquid outlet 16 through the dryer 20, past the sight glass 21, through conduit 22, heat exchanger 24 and conduit 26 to the thermostatic expansion valve 30. The valve 30 controls the flow of liquid through the feed lines 32 into the evaporator 34 where the refrigerant is vaporized to abstract heat from the enclosure 36. The heat laden gaseous refrigerant then flows through the heat exchanger 24, conduit 38, reversing valve 42, and conduit 38a to the control valve 40 and therethrough to the inlet 43 of the compressor 1.

Under extraordinary operating conditions of the system such as, for example, during "pull-down," the pressure of the refrigerant within the evaporator is so high that the work required to drive the compressor is more than the engine 2 can supply. Under such conditions the valve 40 acts to throttle the suction line 38a to reduce the pressure at inlet 43 and consequently the power required to drive the compressor 1. Evaporator pressure transmitted through the conduit 80 and passageways 76 and 78 to the chamber 74 within the bellows 228 causes the movable end wall 230 thereof to move and lift the valve element 83 from its seat 224 to permit pressure to be transmitted from the passageway 76 to the passageway 82 and through the conduit 66 to the passageway 68. The combined total of the suction and discharge pressures of the compressor 1 is communicated to the chambers 56 and 58 respectively by the passageway 59 which is in open communication with the compressor inlet through port 110 and by the passageway 62 (Fig. 6) which is in open communication through conduit 64 to the compressor outlet. With abnormally high evaporator pressures, the combined pressures will move the valve element 60 toward closed position so that the pressure supplied by the conduit 66 into the chamber behind the piston 168 is regulated by the valve element 60. As the pressure within the inlet 43 of the compressor is lowered, the combined effect of the pressures within the chambers 56 and 58 also decreases, thus moving the valve element 60 to admit some fluid from the passageway 68 to the chamber behind the piston 168 to move the valve 172 slightly from its seat 174 permitting a throttled flow of refrigerant from the suction conduit 38a into the inlet 43. The modulated movement of valve element 60 will permit the compressor 1 to operate at the available horsepower of the engine 2. As the temperature of the space 36 and consequently the evaporator 34 is reduced, the pressure within the evaporator will be lowered and consequently the valve element 70 will gradually move toward open position. When the pressures across the compressor 1 are within normal operating range, the work done by the compressor will not exceed the output capacity of the engine 2 and the valve element 60 will be held in wide open position to permit maximum pressure behind the piston 168 whereby the valve element 70 is maintained in its full open position.

If the temperature of the space 36 and evaporator 34 is lowered still further, the pressure within the evaporator correspondingly falls. As the low limit of the desired evaporator temperature and pressure is reached, the pressure within the chamber 74 will have decreased permitting the spring 248 to move the valve element 83 toward its seat 224, throttling fluid flow from the passageway 76 into the passageway 82 for flow through the conduit 66 to the passageway 68. As this flow is reduced, the pressure behind the piston 168 is also reduced so that the valve element 70 moves toward its seat 174 throttling flow of refrigerant from the evaporator 34 to the compressor 1. When the pressure and temperature of the refrigerant in the evaporator 34 reaches the low limit, the valve element 83 will have completely closed its port 224 stopping all flow of gas to the underside of the piston 168. The presence of the orifice or metering port 178, however, permits a continued small flow to the piston 168. Therefore as the valve element 83 reduces the fluid flow to the piston 168 the piston 168 will gradually move the valve element 70 to close the fluid flow past the seat 174, except for such flow as will pass through the normally open ports or apertures 180 in the port controlling member 172 which are provided to prevent an abnormally deep vacuum from being drawn by the compressor 1 which might cause oil slugging or other detrimental operation of the compressor 1.

As the temperature and pressure of the evaporator begin to rise, the pressure in the chamber 78 will likewise increase to move the element 83 slightly from its seat 224 to permit some fluid flow into the chamber behind the piston 168 to modulate the valve element 70 to permit just sufficient refrigerant to be drawn by the compressor 1 from the evaporator 34 to maintain the temperature of the evaporator 34 within the desired narrow temperature limits required to maintain desired temperatures within the space 36. Normally the capacity of the compressor 1 and horsepower output of the engine 2 is such that full or substantially full pressure may be supplied to the compressor 1 slightly before the normal pressures are reached in the evaporator 34. The valve element 70 is powered by the differential in pressure which exists across the piston 168 and which is obtained by maintaining a slight pressure drop between the point of interconnection of the conduits 80 and 38 and the pressure within the compressor inlet 43.

The valve 72 is arranged so that upon starting of the engine 2 the valve knob 252 may be manually pushed in causing the inner end of the stub shaft 238 to engage the movable wall 230 and push the valve element 83 against its seat to prevent any passage of fluid from the passageway 76 through passageway 82, conduit 66 and passageway 68 to the underside of the piston 168. Under this condition the valve element 70 will close the port or seat 174 to block all flow of refrigerant from the evaporator 34 to the compressor 1 except such as passes through the ports 180. This provides a minimum suction pressure in 1 or 2 revolutions of the compressor 1 so that the compressor is effectively unloaded for easy starting of the engine 2. After the engine 2 has been started and is capable of generating its designed horsepower output, the knob 252 is released and the spring 254 moves it back out to its normal shown position (Fig. 3) wherein the position of the valve element 83 is controlled by the pressure within the chamber 74.

With the system of Fig. 1A and the controlling valve of Fig. 4 the pressure within the evaporator 34 is communicated to the chamber 74a by means of the conduit 80. The passageway 82a is supplied with high pressure fluid by the conduit 90 directly from the high pressure side of the refrigerating system either from the vapor above the liquid in the receiver 14 as shown in Fig. 1A or from any other point in the system which is normally maintained above the pressure in the inlet 43. When the system of Fig. 1A is used it is unnecessary to maintain any slight pressure difference between that of the evaporator 34 and that within the inlet 43 of the compressor 1 in order to obtain pressure for operating the piston 168. In this instance the pressure for operating the piston 168 is obtained from the high pressure side of the system which is always maintained at a higher pressure than the pressure within the inlet 43. In other respects the system of Fig. 1A using the valve of Fig. 4 is identical to that described in connection with Fig. 1 and valve 3.

As stated above the pressure gauge 86 is provided to give the operator an indication of the suction pressure of the compressor and the pressure gauge 84, calibrated in terms of temperature, gives the operator an indication of the temperature of the evaporator 34 and consequently of the space 36.

The controlling valve of Fig. 5 may be used either with the system of Fig. 1 or the system of Fig. 1A. The passageway 82b is connected to the conduit 80 and when used in the system of Fig. 1A the passageway 82b is connected to the conduit 90 as shown. The sensitive portion 80c of the valve 72b is located at the point at which the temperature is to be controlled. It may be clamped directly to the evaporator 34 in which event the valve 172b will act to maintain the temperature of the evaporator at a substantially constant temperature as do the pressure controls 72 and 72a or it may be positioned at a selected control point within the space 36 in which event the temperature of the evaporator may vary somewhat but the temperature at the control point within the space 36 will be maintained constant. As the temperature of the feeler portion 80c increases or decreases the pressure responsive fluid contained therein will increase or decrease the pressure within the conduit 80b and consequently within the chamber 74b to move the valve element 83b to regulate the flow of fluid from the passageway 82b into the passageway 76b for flow through the conduit 66 to the controlling valve 40 to actuate the valve 40 as above described.

It will be apparent that since the effective area of the bellows 328 and 338 are equal and the movable walls 330 and 342 thereof are rigidly connected together by means of the element 83b any change in pressure within the chamber 310 externally of the bellows 328 and within the bellows 338 will have equal and opposite effects upon the element 83b and consequently the action of the valve 72b in its movement of the element 83b is dependent entirely upon the pressure within the sensitive feeler 80c. The knob 360 is provided to adjust the tension of the spring 334 whereby the valve 72b may be adjusted to provide for different temperatures to be maintained at the controlled point where the feeler 80c is located.

During normal refrigeration operation a certain amount of frost will be accumulated on the evaporator 34. In order to permit the removal of this frost in a short time without appreciably affecting the temperature within the space 36, the system is provided with a reversing valve 42 under control of a manually operated switch SW for operating the evaporator 34 as a condenser and the condenser 8 as an evaporator. Normal use of the system would usually contemplate the reverse cycle operation of the system just sufficiently to remove the frost from the evaporator 34. However continued reverse cycle operation of the system could be used to provide for heating of the space 36. Upon closure of the switch SW, the solenoid valve 52 is energized to admit high pressure refrigerant from the conduit 54 to the conduit 51 and the element 50 to move the reversing valve 42 to its reversing position in which the discharge conduit 6 is connected to the conduit 38 and the suction conduit 38a is connected to the conduit 6a. With this position of the valve 42 the compressor 1 acts to withdraw refrigerant from the condenser 8 through the conduit 6a, valve 42, conduit 38a to the inlet 43 and discharge refrigerant through the discharge conduit 6, valve 42, and conduit 38 into the evaporator 34. This refrigerant is condensed in the evaporator 34 thereby giving up its heat of condensation to cause melting of the frost and the condensed liquid flows through the feeder lines 32 and reversely through the expansion valve 30 into conduit 26 from whence it flows through the heat exchanger 24, conduit 22, branch conduit 44 to the expansion valve 46. The expansion valve 46 regulates the flow of this liquid into the condenser 8 for evaporation therein by which it may absorb its heat of vaporization. Any excess liquid drained from the evaporator 34 will flow backwardly through the dryer 20 into the receiver 14 and likewise the receiver 14 is operable to supply additional liquid for reverse cycle operation if necessary. It will be noted that the check valve 48 prevents flow of high pressure vapor or liquid outwardly of the receiver 14 through the conduit 12 directly to the condenser 8. After sufficient reverse cycle operation of the system has occurred for either defrosting of the evaporator 34 or heating of the space 36, the switch SW may be opened permitting the valve 52 to disconnect the conduit 51 from the conduit 54 and to connect this conduit 51 to the conduit 53 whereby the pressure in the element 50 is lowered to that of the suction conduit 38a. This lowering of the pressure within the element 50 causes the reversing valve 42 to move back to its normal operating position in which the conduits 6 and 6a are connected together and the conduits 38 and 38a are connected together.

Referring again to the normal refrigerating operation of the system, it will be observed that the system can be adjusted to refrigerate the space 36 to any desired temperature without fear of overloading the compressor. For example, suppose the system were normally designed to maintain a 25° F. temperature within the space 36. The engine 2 would be chosen with respect to the compressor 1 so that during this normal operation the compressor could be operated with the valve element 70 substantially in full open position without overloading the engine 2. If now this same system were adjusted to maintain a 40° or 45° temperature within the space 36, the pressures within the evaporator 34 will of necessity be higher and may be so high as to require a greater horsepower to drive the compressor 1 than may be supplied by the engine 2. By use of the present invention, however, the intake to the compressor 1 is so regulated that the required horsepower to drive the compressor 1 never exceeds the available horsepower of the engine 2. It may be that the compressor is not operated at maximum capacity but at the same time the engine is operated at maximum capacity and the maximum refrigerating work is being done by the system.

In many instances when using this system to maintain the space 34 at different temperature levels it has been found desirable to select an engine compressor combination in which the engine has sufficient available horsepower to drive the compressor with the valve element 70 in wide open position when maintaining the lowest expected desired temperature in the evaporator 34 and to use the valve 40 to prevent overloading of the engine 2 when the system is being used to maintain higher temperatures within the space 36. If it is believed that when the system will only operate rarely at these lower temperatures, the equilibrium points may be chosen at the lowest temperature at which there will be any substantial operation of the system.

From certain experiments carried out by applicant it has been ascertained that a 4 lb. increase in head or discharge pressure can be counterbalanced by a 1 lb. decrease in suction or back pressure to maintain a uniform load on the engine 2. Bearing these relationships in mind, the effect produced by changes of pressure in the chambers 56 and 58 have been designed so that a 4 lb. increase of pressure in the chamber 58 will be balanced by a 1 lb. decrease in pressure within the chamber 56 and vice versa. It may be that with various refrigerants and various compressors slight changes in balance may be required between the effects of the pressure within the chambers 56 and 58. However, applicant has found that this ratio when using Freon 12 works satisfactorily.

By changing the force exerted by the spring 164 by means of rotating the cap 162, the valve 40 may be adjusted to control the refrigerant admitted to the compressor 1 to utilize any desired maximum horsepower for operating the compressor.

With applicant's construction of the valve 40 in which the reduced diameter stem 140 is threaded and the movable walls 138 and 150 are held thereto by means of nuts, the bellows 134 and 144 may be easily removed upon removal of the tubular member 120 so that a different ratio of pressure effects may be had between the pressures appearing in the chambers 56 and 58.

What is claimed and is desired to be secured by United States Letters Patent is as follows:

1. A valve structure comprising a body having a chamber, said chamber having an inlet and an outlet whereby said chamber may be inserted in a suction line of a refrigerating system, means in said chamber intermediate said inlet and said outlet providing a valve seat, said chamber being formed to provide a piston chamber portion on the outlet side of said seat, a piston in said piston chamber portion, a valve cooperable with said seat to control fluid flow therethrough, an actuator connecting said valve and said piston, said body having a wall adjacent said piston chamber portion on the side of said piston away from said seat, said wall having a port, a valve controlling flow through said port, said body having a passageway leading to said port and opening therethrough into said piston chamber portion, said body having an aperture opening outwardly thereof, a pair of pressure sensitive elements within said aperture and having movable pressure responsive walls, means connecting said pressure responsive walls to said last-named valve, said body having a passageway opening into one of said pair of elements and into said body chamber whereby increase of pressure in said body chamber acts in one direction on said valve, and fluid conveying means operable to supply fluid pressure to the other of said pair of elements whereby increase of pressure in said fluid conveying means acts in the same direction on said valve.

2. A valve structure comprising a body having a chamber, said chamber having an inlet and an outlet whereby said chamber may be inserted in a suction line of a refrigerating system, means in said chamber intermediate said inlet and said outlet providing a valve seat, said chamber being formed to provide a piston chamber portion on the outlet side of said seat, a piston in said piston chamber portion, a valve cooperable with said seat to control fluid flow therethrough, an actuator connecting said valve and said piston, said body having a wall adjacent said piston chamber portion on the side of said piston away from said seat, said wall having a port, a valve controlling flow through said port, said body having a passageway leading to said port and opening therethrough into said piston chamber portion, said body having an aperture opening outwardly thereof, a pair of concentrically arranged bellows within said aperture, each said bellows having a movable pressure responsive wall at one end portion thereof, means connecting both of said pressure responsive walls to said last-named valve to act thereupon in the same direction, means sealing the other end portions of said bellows to said body to provide a pair of chambers, and fluid flow means to transmit control pressures to said pair of chambers.

3. In an apparatus of the class described, a casing having a fluid flow passageway therethrough, a valve member controlling fluid flow through said passageway, a pressure sensitive means carried by said casing and having a movable portion operatively arranged to control said valve member, passageway means for transmitting the pressure within said passageway at one side of said valve member to said pressure sensitive means, said apparatus being adapted for association with a fluid compressor and said pressure sensitive means comprising a pair of pressure sensitive elements one of which elements is in continuous open communication with said passageway means independently of the position of the valve member, whereby it is adapted to be sensitive to the inlet pressure of the compressor, and passageway means in continuous open communication with the other of said elements independently of the position of the valve and adapted to be connected to the discharge side of the compressor.

4. The combination of claim 3 in which each of said elements comprises a pressure sensitive portion and in which said portions are mechanically connected together and to said valve.

5. The combination of claim 4 in which an increase in pressure in each of said elements acts to urge said valve member in the same controlling movement.

6. In an apparatus of the character described, a body member having a passageway for fluid, a valve member controlling fluid flow through said passageway, said body member being provided with a piston chamber opening into said passageway, a piston member within said chamber and having an operative connection with said valve member, a pressure sensitive element, means independent of the positions of the piston member and valve member for transmitting the fluid pressure from said passageway at the outlet side of said valve member to said element, means providing a fluid flow passageway to one portion of said chamber on the opposite side of said piston from said passageway, and a fluid flow controlling valve actuated by said element and controlling fluid flow through said last-named means, said piston being provided with a restricted fluid flow passageway communicatively connecting said chamber one portion and said passageway.

References Cited in the file of this patent

UNITED STATES PATENTS

| | | |
|---|---|---|
| 1,843,953 | McKinney | Feb. 9, 1932 |
| 1,987,505 | Edler | Jan. 8, 1935 |
| 2,061,599 | Smith | Nov. 24, 1936 |
| 2,304,323 | Wiegers | Dec. 8, 1942 |
| 2,311,110 | Johnson | Feb. 16, 1943 |
| 2,328,279 | Jones | Aug. 31, 1943 |
| 2,387,793 | Holmes | Oct. 30, 1945 |
| 2,403,818 | McGrath | July 9, 1946 |
| 2,415,338 | Carter | Feb. 4, 1947 |
| 2,440,534 | Atchison | Apr. 27, 1948 |
| 2,443,581 | Lange | June 15, 1948 |
| 2,475,556 | Seligman et al. | July 5, 1949 |
| 2,506,724 | Lindgren | May 9, 1950 |
| 2,508,010 | Bower | May 16, 1950 |
| 2,581,956 | Jones | Jan. 8, 1952 |